(12) United States Patent
Benari

(10) Patent No.: US 8,364,643 B2
(45) Date of Patent: Jan. 29, 2013

(54) METHOD AND SYSTEM THEREOF FOR RESTORING VIRTUAL DESKTOPS

(75) Inventor: Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 510 days.

(21) Appl. No.: 12/186,012

(22) Filed: Aug. 5, 2008

(65) Prior Publication Data

US 2009/0144515 A1   Jun. 4, 2009

Related U.S. Application Data

(60) Provisional application No. 60/992,326, filed on Dec. 4, 2007.

(51) Int. Cl.
*G06F 7/00* (2006.01)
*G06F 17/00* (2006.01)
(52) U.S. Cl. ........................................ 707/649; 707/682
(58) Field of Classification Search .................. 707/649, 707/682
See application file for complete search history.

(56) References Cited

U.S. PATENT DOCUMENTS

| | | | |
|---|---|---|---|
| 6,397,242 B1 | 5/2002 | Devine et al. | |
| 6,496,847 B1 | 12/2002 | Bugnion et al. | |
| 6,771,843 B1 | 8/2004 | Huber et al. | |
| 6,961,941 B1 | 11/2005 | Nelson et al. | |
| 7,529,897 B1 * | 5/2009 | Waldspurger et al. | 711/162 |
| 2005/0171979 A1 * | 8/2005 | Stager et al. | 707/200 |
| 2006/0085668 A1 | 4/2006 | Garrett | |
| 2007/0055833 A1 * | 3/2007 | Vu et al. | 711/162 |
| 2008/0010422 A1 * | 1/2008 | Suzuki et al. | 711/162 |

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Mariela Reyes
(74) *Attorney, Agent, or Firm* — Lowenstein Sandler PC

(57) ABSTRACT

A method and system thereof for restoring a virtual desktop are presented. A method may include generating a try-snapshot upon selection of a restore point of the virtual desktop, wherein the try-snapshot is an empty file. The method may further include linking the try-snapshot subsequently to a snapshot of the restore point without modifying snapshots created after the snapshot of the restore point and using the try-snapshot as an active snapshot upon affirmation of said restore point.

18 Claims, 5 Drawing Sheets

METHOD AND SYSTEM THEREOF FOR RESTORING VIRTUAL DESKTOPS

CROSS REFERENCE TO RELATED APPLICATIONS

The patent application claims the benefit of U.S. provisional application No. 60/992,326 filed on Dec. 4, 2007, the contents of which are herein incorporated by reference.

TECHNICAL FIELD OF THE INVENTION

The present invention relates generally to solutions for restoring virtual desktops.

BACKGROUND OF THE INVENTION

Virtual machines enable a host computer to run simultaneously multiple applications or operating systems on the same computer. The host computer allocates a certain amount of the host's resources to each of the virtual machines. Each virtual machine is then able to use the allocated resources to execute applications, including operating systems. The virtual machine virtualizes the underlying hardware of the host computer or emulates hardware devices, making the use of the virtual machine transparent to the operating system or the user of the computer. In the virtual personal computer (PC) environment, the PC hardware is shared between multiple virtual machines.

Historically, due to the complexity and processing requirements of virtualization, this technology has typically been available only on servers and/or mainframes, targeted for the use by sophisticated users. However, as CPU technology advances, virtualization is currently being made available for the desktop environment (e.g., PCs with x86 processor architecture) for use by novice users. In the related art, techniques enabling virtualization of x86 architecture based processors may be found, for example, in U.S. Pat. Nos. 6,397,242, 6,496,847 and 6,961,941 that are incorporated herein by reference merely for the useful understanding of the background of the invention. Solutions for virtualization of desktop environments are provided, for example, by VMware®, Inc., Xen™.

Recently, solutions for providing centralized hosting for virtual machines that execute (virtual) desktops have been developed. Such solutions consist of centralized servers that are partitioned into multiple virtual machines that host the virtual desktops, thereby providing a desktop for each user. The centralized hosting provides the manageability of server-based computing, while the dedicated environment provides the flexibility and compatibility with applications that a desktop enables.

FIG. 1 shows a diagram of a centralized hosting system 100 of virtual desktops. The system 100 includes a number of N servers 110-1 through 110-N, each of which is 'capable of executing a cluster of virtual machines. Each virtual machine is dedicated to run a virtual desktop. The servers 110 are coupled to storage devices including at least a virtual machine disk (VM-disk) 120 and a user-data disk 125. The VM-disk 120 maintains information required for the execution of a virtual desktop typically in the form of templates and snapshots. The user-data disk 125 maintains information saved by users, e.g., documents, emails, and so on. The system 100 further includes a controller (not shown) that manages desktops virtually installed on servers 110. Generally, the controller executes the tasks including, for example, installation of desktops, recovery and restore of desktops, and the likes. A network 140 connects endusers of client computers 150-1 through 150-M to the servers 110. The network 140 may include a local area network (LAN), a wide area network (WAN), the Internet, or any combination thereof.

A template usually includes an operating system (OS) and a set of common applications to a group of users. The utilization of templates eases the installation and management of virtual desktops in an organization. For example, two different templates may be defined: one for the finance division and the other for the research and development division. Each template may include different sets of applications, users' and machine's settings, and operating systems. Snapshots typically include changes made to initial configuration of the virtual desktop (i.e., templates). For example, changes to applications or settings made by a user after the initial setup and installation of new applications or software patches.

FIG. 2 shows a data structure 200 used for managing snapshots of virtual desktops. The data structure 200 is in a tree form where the root 210 is the template and each node 220 is a snapshot taken by the user (e.g., when the user backs up the desktop) and represents the state of the virtual machine at the time the snapshot was created.

The disadvantage of the tree structure 200 is that a restore point cannot be correlated to a specific time, but rather to a certain state of the virtual desktop. For example, each node 220 may include a snapshot copy of a different installation version of an application executed by the desktop. A user trying to recover a desktop cannot tell from the structure 200 when different versions were installed and what the best operation mode that the desktop should be returned to is. Another major disadvantage of the tree structure 200 is that users cannot restore their desktop without modifying the snapshot (backup) copy to which the desktop is returned. For example, if the current state of the virtual machine is represented using a snapshot of node 220-5 and the user decides to return to a snapshot of node 220-3, this snapshot is modified. As a result, the user cannot rollback to a previous state or to any other state of the virtual desktop.

It would be therefore advantageous to provide a solution for managing snapshots of virtual desktops to efficiently restore the virtual desktops.

SUMMARY OF THE INVENTION

Certain embodiments of the invention include a method for restoring a virtual desktop. The method comprises generating a try-snapshot upon selection of a restore point of the virtual desktop, wherein the try-snapshot is an empty file; linking the try-snapshot subsequently to a snapshot of the restore point without modifying snapshots created after the snapshot of the restore point; and using the try-snapshot as an active snapshot upon affirmation of said restore point.

Certain embodiments of the invention also include a system for restoring a virtual desktop in a centralized hosting system of virtual desktops. The system comprises a virtual machine for executing the virtual desktop; a virtual disk for maintaining at least a plurality of snapshots, wherein the snapshots are adapted to allow the execution of the virtual desktop; a controller for controlling a process of restoring the virtual desktop, wherein the process of restoring the virtual desktop comprising: generating a try-snapshot upon selection of a restore point, linking the try-snapshot subsequent to a snapshot of a selected restore point without modifying snapshots created after the snapshot of the selected restore point, and using the try-snapshot as an active snapshot upon affirmation of the restore point.

Certain embodiments of the invention further include a computer readable medium having stored thereon a computer executable code, when executed by a computer, for restoring a virtual desktop. The computer executable code causes a computer to execute the process of generating a try-snapshot upon selection of a restore point of the virtual desktop, wherein the try-snapshot is an empty file; linking the try-snapshot subsequently to a snapshot of the restore point without modifying snapshots created after the snapshot of the restore point; and using the try-snapshot as an active snapshot upon affirmation of said restore point.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
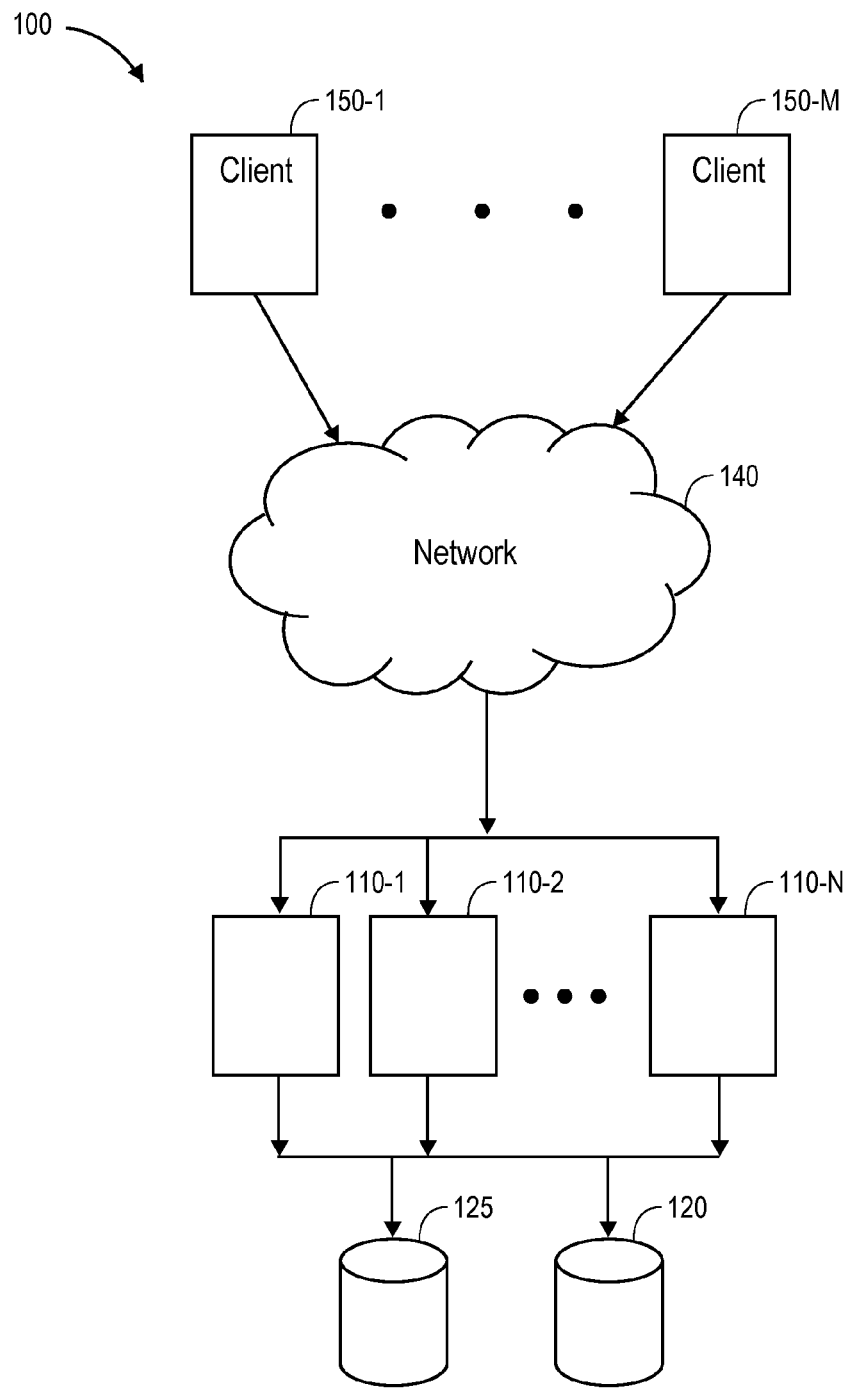
FIG. 1 is a diagram of a centralized hosting system of virtual desktops.
Figure 2:
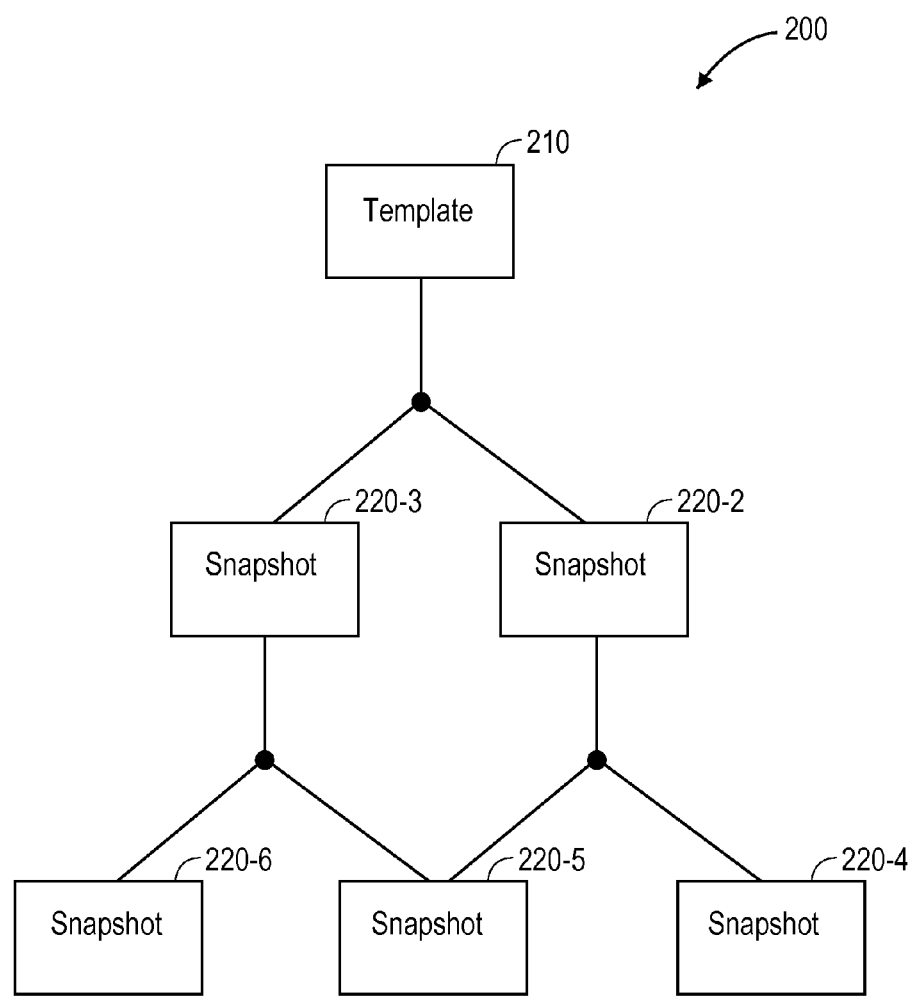
FIG. 2 is a typical data structure used for managing snapshots of virtual desktops.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In order to overcome the shortcomings of prior art solutions for restoring virtual desktops, the invention uses a snapshots timeline management technique enabling the restore of virtual desktops. Specifically, the method enables restoring a virtual desktop to any operational state at any point in time. In addition, the user may try various states of the virtual desktop and to return to the current state without modifying the operation of the virtual desktop.

Figure 3:
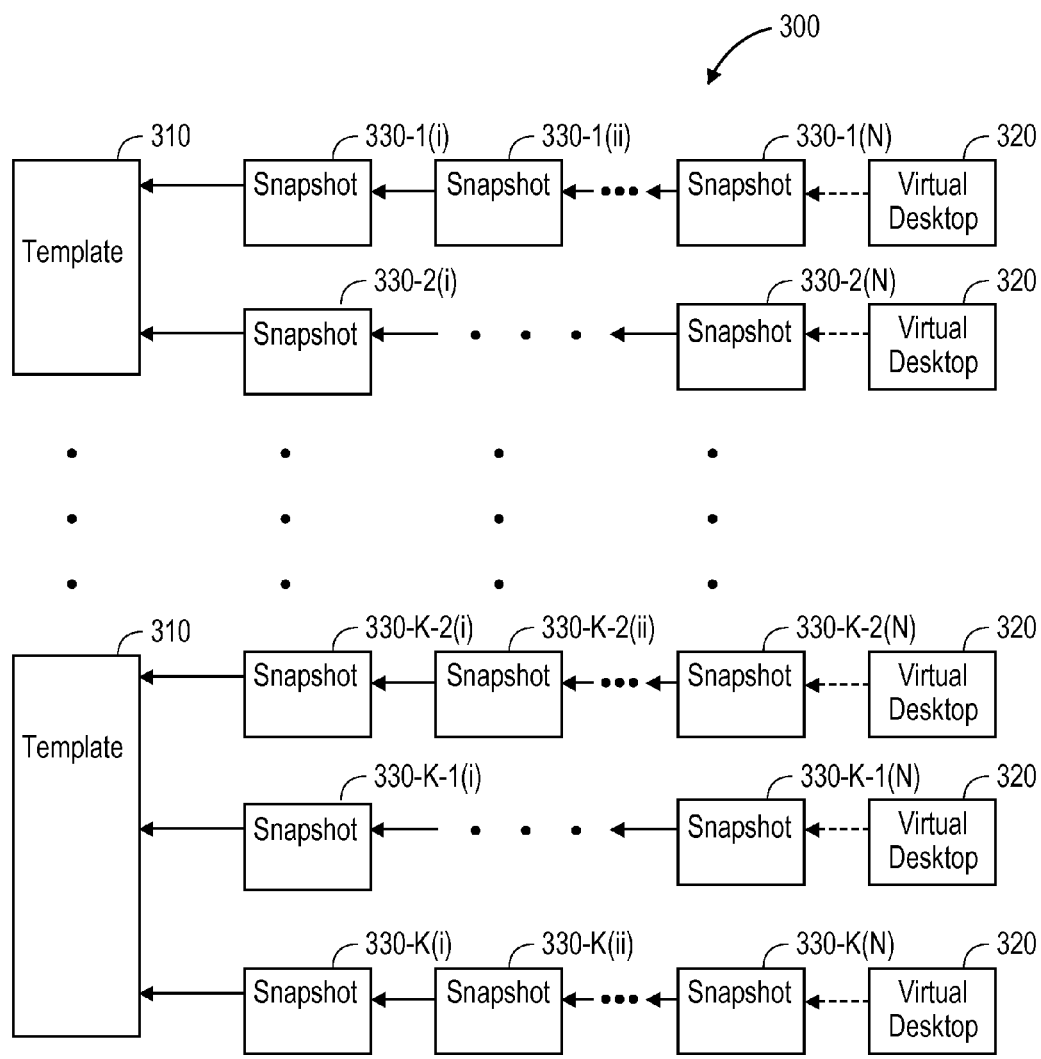
FIG. 3 is a data structure for managing snapshots of virtual desktops implemented in accordance with an embodiment of the invention.

FIG. 3 shows an exemplary data structure 300 for managing snapshots of virtual desktops implemented in accordance with an embodiment of the invention. The data structure 300 includes a template 310 shared between K different desktops 320. Each desktop 320 has a linked list of snapshots, for example snapshots 330-1(i) through 330-1 for the $1^{st}$ desktop 320 and snapshots 330-K(i) through 330-K(N) for the $K^{th}$ desktop 320. Each snapshot 330-1 through 330-K is created when a user of a desktop makes changes that affect the operation of the desktop. These changes may include, for example, installation of new applications or software patches changing behaviors of installed applications, user's or driver's settings, and so on.

In accordance with the principles of the invention, for example, a snapshot 330-1(ii) includes only changes made on a virtual machine disk (e.g., a VM-disk 120) of the desktop between the time that a snapshot 330-1 was taken and the time that the current snapshot 330-1(ii) is created. Each snapshot 330-1-330-K represents the operation state of its respective desktop at the time that the snapshot is created. The virtual desktop sequentially reads the content of its respective snapshots 330-1-330-K from the last snapshot through the template 310 during its operation. Generally, a snapshot provides the ability to "freeze" the view of the file system contents, i.e., a snapshot is a copy of a file, disk, or other storage unit at a certain point in time. A request for taking a snapshot can be initiated automatically every predefined time interval, when the content of the VM-disk is modified, or by a system administrator of the centralized hosting system.

Figure 4:
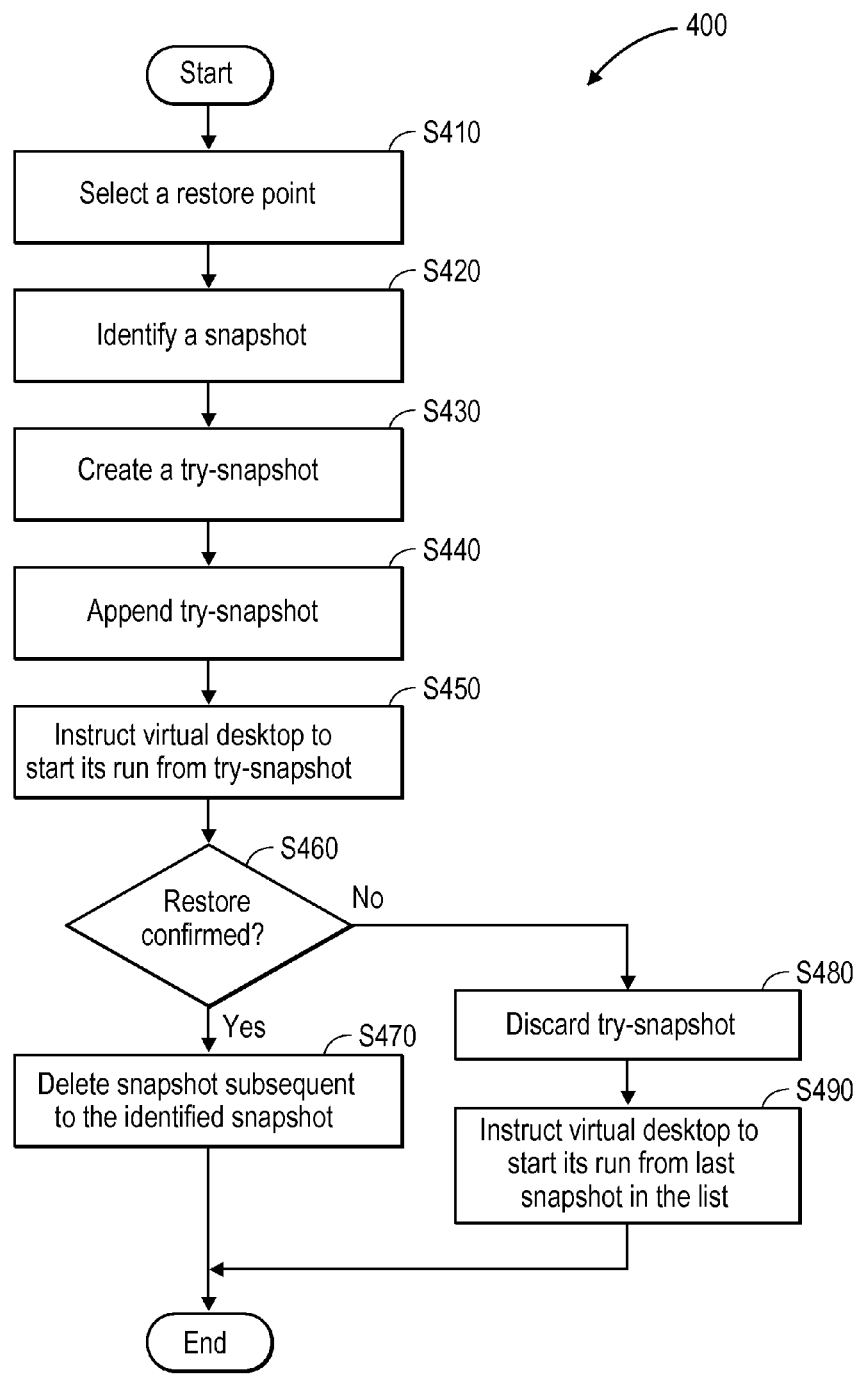
FIG. 4 is a flowchart describing a method for restoring a virtual desktop implemented in accordance with an embodiment of the invention.
Figure 5A:
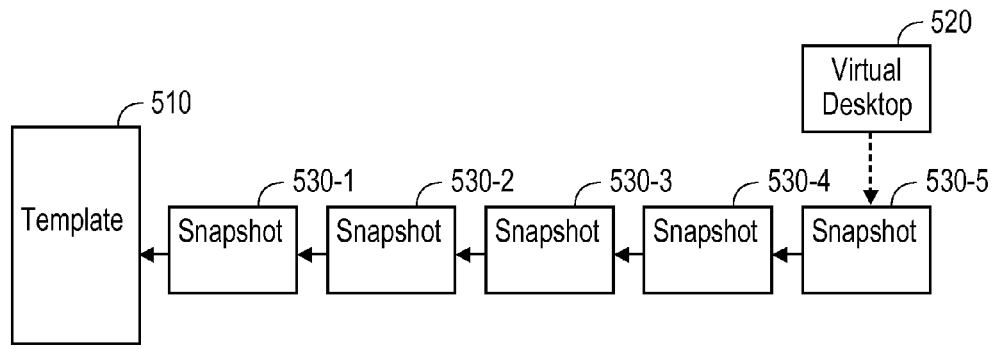
FIGS. 5A, 5B and 5C are exemplary data structures used to describe the restore method.

FIG. 4 shows a non-limiting and exemplary flowchart 400 describing the method for restoring a virtual desktop implemented in accordance with an embodiment of the invention. The method will be described with reference to a data structure 500 provided in FIGS. 5A-5C. The data structure 500 includes a template 510 of a virtual desktop 520 and a linked list of snapshots 530-1 through 530-5, each of which stores changes made to a VM-disk of the virtual desktop 520 at a different point in time. It should be noted that the data structure is merely provided as a non-limiting example and the method can operate with data structures that include snapshots of a plurality of virtual desktops.

At S410, a user of the virtual desktop 520 selects an earlier restore-point that relates to any of snapshots 530-1 through 530-5 by, for example, specifying the time (e.g., a date and hour) of the restore-point or a description of a snapshot 530. At S420, the respective snapshot 530 of the selected restore point is identified. At S430, a new snapshot (hereinafter the "try-snapshot") is generated. The try-snapshot is an empty file that does not contain any data.

Figure 5B:
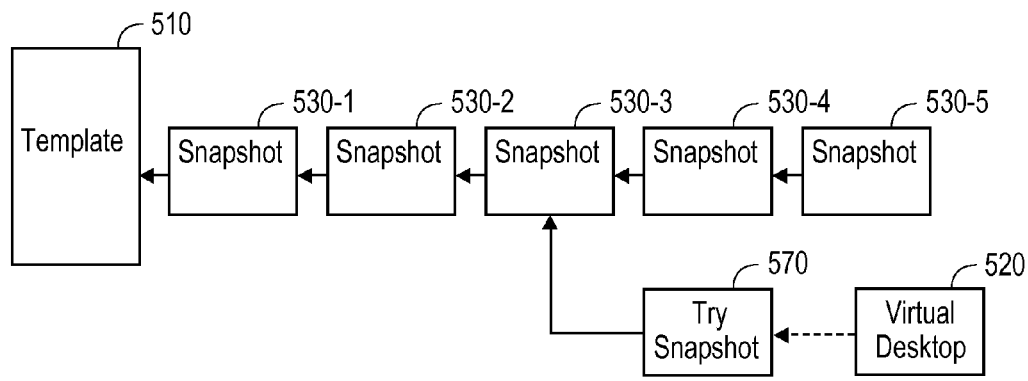

At S440 the try-snapshot is linked as a subsequent snapshot to the identified snapshot of the selected restore-point. This is performed without changing and/or deleting the snapshots that are originally connected after (i.e., snapshots that were created after the restore point) the snapshot of the restore point. As can be seen in FIG. 5B a try-snapshot 570 is appended to the snapshot 530-3, which is the snapshot of a selected restore-point. The snapshots 530-4 and 530-5 remain untouched. Any changes made to the VMdisk of the virtual desktop 520 after the creation of the try-snapshot 570 are included therein. At S450, the virtual desktop 320 is instructed to sequentially read the content of the snapshots 530 from the try-snapshot 570. Thereafter, any changes made to virtual desktop are saved in the try snapshot 570.

It is appreciated that the utilization of a try-snapshot allows the user to try any previous operational state of the virtual machine. For example, if the creation times (i.e., restore points) of snapshots 530-3, 530-4, 530-5 and 570 are Jan. 1, 2007, Jan. 7, 2007, Jan. 14, 2007, and Jan. 16, 2007. In the above example, on Jan. 16, 2007 the user requested to restore the virtual desktop 520 to its state as logged on Jan. 7, 2007. The user may try this operation state to check if the virtual desktop functions as expected and at the same time changes made to the desktop are saved in the try desktop 570. If the user decides that the snapshot 530-3 does not function properly, the user can return to the desktop state as logged on Jan. 14, 2007 as its respective snapshot 530-5 has not been modified. This is opposed to prior art solutions that do not allow rolling back to the last active states once a restore point is chosen.

Figure 5C:
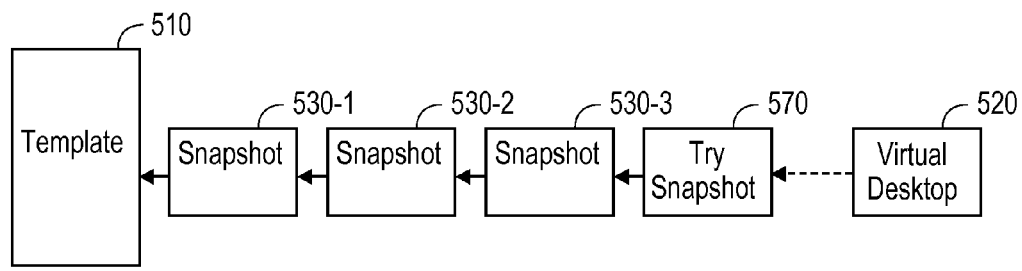

At S460 it is checked if the user decided to confirm the restored state of the virtual desktop, and if so execution continues with S470 where the snapshots subsequent to the snapshot of the selected restore-point are deleted and the try-snapshot is determined to be the latest snapshot. For instance, as shown in FIG. 5C the snapshots 530-4 and 530-5 are deleted. If S460 results with a 'No' answer, then at S480 the try-snapshot is discarded. Thereafter, at S490 the virtual desktop is instructed to read the content of the snapshots starting from the latest snapshots (e.g., snapshot 530-5).

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What we claim is:

1. A method comprising:
    selecting, by a host controller computing machine, a restore point of a virtual desktop that is managed by the host controller computing machine;
    generating, by the host controller computing machine, a try-snapshot upon selection of the restore point, wherein the try-snapshot is an empty file that does not contain data and is a place holder associated with an operational state of the virtual desktop;
    linking, by the host controller computing machine, the try-snapshot at a position subsequent to a snapshot of the selected restore point, wherein the linking the try-snapshot prevents one or more other snapshots created after the snapshot from being modified;
    querying, by the hosting controller computing machine, a user of the virtual desktop for one of a confirmation or a rejection of the selected restore point;
    when the user confirms the selected restore point:
        converting, by the host controller computing machine, the try-snapshot to an active snapshot;
        writing, to the try-snapshot, all changes made to the virtual machine disk;
        reading, from the try-snapshot, all changes made to the virtual machine disk; and
        deleting, by the host controller computing machine, restore points subsequent to the selected restore point; and
    when the user rejects the selected restore point:
        discarding, by the host controller computing machine, the try-snapshot; and
        returning, by the host controller computing machine, a state of the virtual desktop back to a previous state of the virtual desktop represented by a snapshot of a most recent restore point created for the virtual desktop.

2. The method of claim 1, wherein selecting the restore point comprises specifying a time of the restore point.

3. The method of claim 1, wherein the snapshot is stored in a tree data structure managing one or more snapshots of the virtual desktop.

4. The method of claim 3, wherein linking the try-snapshot further comprises appending the try-snapshot to a node in the tree data structure representing the snapshot of the selected restore point.

5. The method of claim 1, wherein selecting the restore point comprises specifying a description of the restore point.

6. The method of claim 1, wherein the snapshot of the selected restore point comprises a file representing all changes made to a template of the virtual machine disk that existed at a time of the selected restore point.

7. A system comprising:
    a host computing machine hosting a virtual machine that virtualizes underlying hardware of the host computing machine, the virtual machine for executing a virtual desktop;
    a storage device comprising a virtual disk to maintain at least a plurality of snapshots, wherein the snapshots are configured to allow the execution of the virtual desktop; and
    a controller computing machine to control a process of restoring the virtual desktop, the controller computing machine configured to:
        select a restore point of the virtual desktop;
        generate a try-snapshot upon selection of the restore point, wherein the try-snapshot is an empty file that does not contain any data and is a place holder associated with an operational state of the virtual desktop;
        link the try-snapshot at a position subsequent to a snapshot of the selected restore point, wherein the linking the try-snapshot prevents one or more other snapshots created after the snapshot from being modified;
        query a user of the virtual desktop for one of a confirmation or a rejection of the selected restore point;
        when the user confirms the selected restore point:
            convert the try-snapshot to an active snapshot;

write, to the try-snapshot, all changes made to the virtual machine disk;
read, from the try-snapshot, all changes made to the virtual machine disk; and
delete restore points subsequent to the selected restore point; and when the user rejects the selected restore point:
discard the try-snapshot; and
return a state of the virtual desktop back to a previous state of the virtual desktop represented by a snapshot of a most recent restore point created for the virtual desktop.

8. The system of claim 7, wherein the selecting the restore point comprises specifying a time of the restore point.

9. The system of claim 7, wherein the snapshot is stored in a tree data structure managing one or more snapshots of the virtual desktop.

10. The system of claim 9, wherein linking the try-snapshot further comprises appending the try-snapshot to a node in the tree data structure representing the snapshot of the selected restore point.

11. The system of claim 7, wherein selecting the restore point comprises specifying a description of the restore point.

12. The system of claim 7, wherein the snapshot of the selected restore point comprises a file representing all changes made to a template of the virtual machine disk that existed at a time of the selected restore point.

13. A non-transitory computer readable storage medium including data that, when executed by a machine, cause the machine to perform operations comprising:
selecting, by a host controller computing machine, a restore point of the virtual desktop;
generating, by the host controller computing machine, a try-snapshot upon selection of the restore point, wherein the try-snapshot is an empty file that does not contain any data and is a place holder associated with an operational state of the virtual desktop;
linking, by the host controller computing machine, the try-snapshot at a position subsequent to a snapshot of the selected restore point, wherein the linking the try-snapshot prevents one or more other snapshots created after the snapshot from being modified;
querying, by the hosting controller computing machine, a user of the virtual desktop for one of a confirmation or a rejection of the selected restore point;
when the user confirms the selected restore point:
converting, by the host controller computing machine, the try-snapshot to an active snapshot;
writing, to the try-snapshot, all changes made to the virtual machine disk;
reading, from the try-snapshot, all changes made to the virtual machine disk; and
deleting, by the host controller computing machine, restore points subsequent to the selected restore point; and
when the user rejects the selected restore point:
discarding, by the host controller computing machine, the try-snapshot; and
returning, by the host controller computing machine, a state of the virtual desktop back to a previous state of the virtual desktop represented by a snapshot of a most recent restore point created for the virtual desktop.

14. The non-transitory computer readable storage medium of claim 13, wherein the selection of the restore point comprises specifying a time of the restore point.

15. The non-transitory computer readable medium of claim 14, wherein the snapshot is stored in a tree data structure managing one or more snapshots of the virtual desktop.

16. The non-transitory computer readable medium of claim 15, wherein linking the try-snapshot further comprises appending the try-snapshot to a node in the tree data structure representing the snapshot of the selected restore point.

17. The non-transitory computer readable medium of claim 13, wherein selecting the restore point comprises specifying a description of the restore point.

18. The non-transitory computer readable medium of claim 13, wherein the snapshot of the selected restore point comprises a file representing all changes made to a template of the virtual machine disk that existed at a time of the selected restore point.

* * * * *